No. 616,729. Patented Dec. 27, 1898.
G. L. REENSTIERNA.
CLUTCH MECHANISM.
(Application filed Oct. 25, 1897.)
(No Model.)
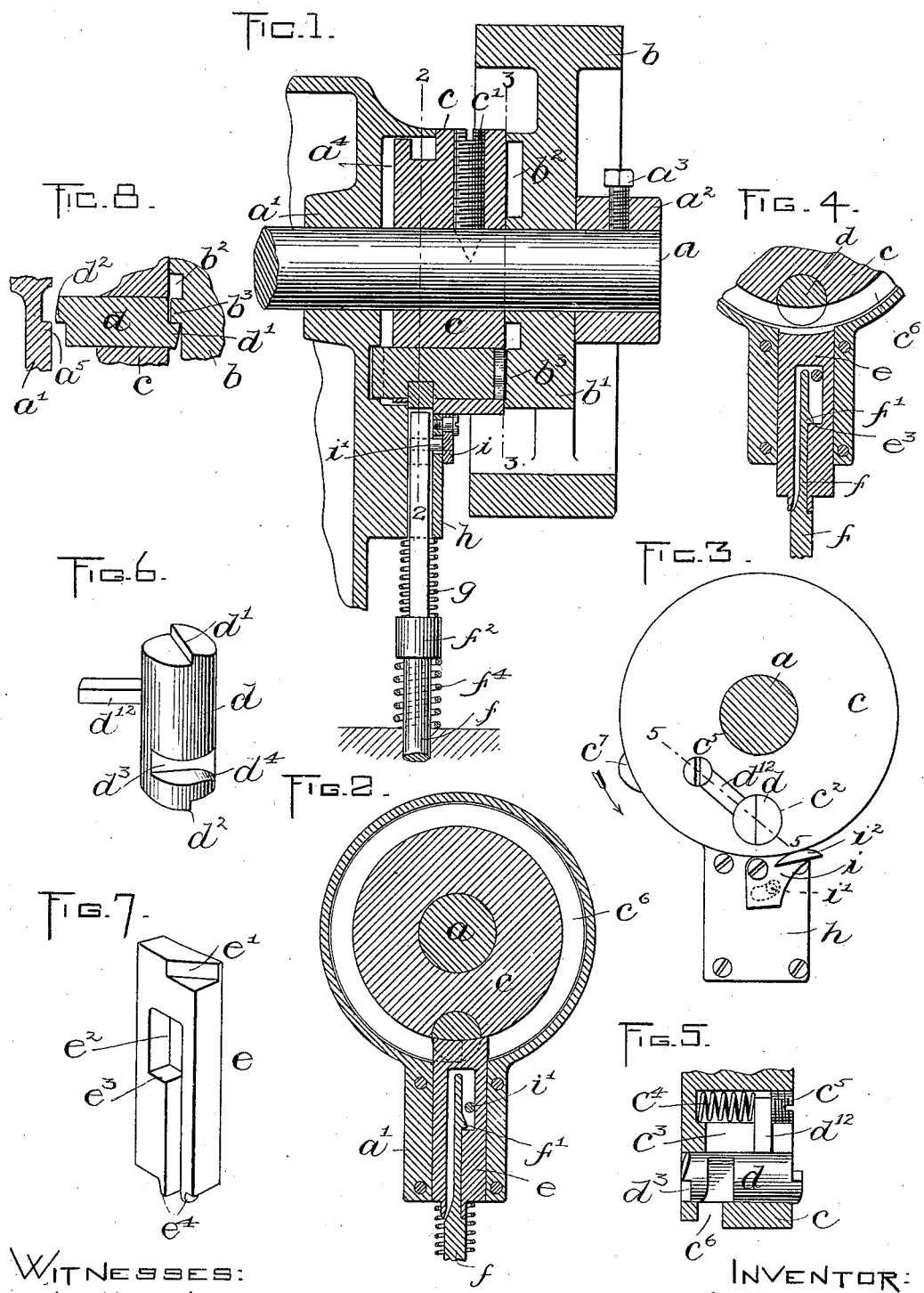
WITNESSES:
INVENTOR:

UNITED STATES PATENT OFFICE.

GUSTAF LIBERT REENSTIERNA, OF BOSTON, MASSACHUSETTS, ASSIGNOR, BY MESNE ASSIGNMENTS, TO THEOPHILUS KING, OF SAME PLACE.

CLUTCH MECHANISM.

SPECIFICATION forming part of Letters Patent No. 616,729, dated December 27, 1898.

Application filed October 25, 1897. Serial No. 656,352. (No model.)

*To all whom it may concern:*

Be it known that I, GUSTAF LIBERT REENSTIERNA, of Boston, in the county of Suffolk and State of Massachusetts, have invented certain new and useful Improvements in Clutch Mechanism, of which the following is a specification.

This invention has relation to clutches generally, but more particularly to that class of mechanisms in which a rotating driving member is connected to a driven member for a predetermined time and then automatically disconnected therefrom, such mechanism being employed in machines of various kinds—such as eyeleting, riveting, and other analogous machines.

The present invention consists in certain features of construction and arrangement of parts, which are illustrated upon the drawings and which I shall now proceed to describe in detail and then point out in the claims.

Reference is to be had to the accompanying drawings, and to the letters marked thereon, forming a part of this specification, the same letters designating the same parts or features, as the case may be, wherever they occur.

Of the drawings, Figure 1 represents in vertical longitudinal section one form of clutch mechanism in which my invention is embodied. Fig. 2 represents a transverse section through the same on the line 2 2 of Fig. 1. Fig. 3 represents a face view of the collar carrying the clutch, it being a section on the line 3 3 of Fig. 1. Fig. 4 represents a section somewhat similar to Fig. 2, but showing the parts in position to allow the clutch to engage the pulley. Fig. 5 represents a section on the line 5 5 of Fig. 3. Figs. 6, 7, and 8 illustrate in detail the clutch and the clutch-operating device which disengages the clutch from the pulley.

Referring to the drawings and to the mechanism selected by me for the purpose of illustrating an embodiment of the invention, $a$ indicates a shaft to which it is desired to give an intermittent movement or rotation. It is mounted in bearings in a stationary frame or standard $a'$ and projects beyond the same, as shown in Fig. 1. Placed loosely on the end of the shaft and held thereon by a collar $a^2$ and set-screw $a^3$ is a driving member consisting of a band or belt pulley $b$, having an enlarged hub $b'$. In the inner face of the hub is a series of notches $b^2$ and teeth $b^3$ for a purpose to be described. The frame or standard $a'$ is formed with a recess or cavity $a^4$, and partly in the cavity and between the standard or the pulley $b$ is placed a driven member consisting of a wheel or clutch-supporting member $c$, held rigidly upon the shaft by a set-screw $c'$. This wheel or clutch-carrying member is provided with a cylindrical through-aperture $c^2$, in which is placed a loose clutch $d$ in parallelism with the shaft $a$. By mechanism which I shall now describe the clutch is thrust into engagement with one of the teeth on the inner face of the belt-pulley $b'$, so as to clutch the pulley and the shaft together, and is then withdrawn after the shaft has made one complete rotation.

The clutch is formed on its front end with a projecting shoulder $d'$ and on its other end with an oppositely-arranged shoulder $d^2$. The first-mentioned shoulder is adapted to engage with a tooth on the belt-wheel $b$, and the shoulder $d^2$ is adapted to engage with a stop or tooth $a^5$ on the stationary frame or standard $a'$. Secured to the clutch $d$ is a transversely-arranged bar or stud $d^{12}$, projecting into an aperture $c^3$ in the disk $c$, and bearing against said stud or bar is a spring $c^4$, which normally tends to hold the clutch outward and in engagement with a tooth on the band-pulley $b$, there being a stop in the form of a set-screw $c^5$, against which the said stud $d^2$ may engage and which limits the outward movement of the said clutch $d$. The clutch-carrying disk or wheel $c$ is provided with a circumferential groove $c^6$, so as to expose the side of the clutch $d$, which latter is likewise formed with a transverse groove $d^3$, which is widened at its mouth, as at $d^4$. Normally the said clutch is held in its inoperative position and in engagement with the stop $a^5$ by means of a clutch-operating device or latch-bar $e$, as shown in Figs. 2 to 4 and 7. The upper end of the said latch-bar is beveled or wedge-shaped, as at $e'$, and it is hollowed out, as at $e^2$, to receive the upper end of a rod $f$, there being an internal shoulder $e^3$, which may be engaged by a projection $f'$ on the upper reduced or spring end of the said rod $f$. The spring $g$ is placed between a collar $f^2$ on the rod $f$ and the lower end of the bar $e$, which is provided with lips $e^4$ to project into the spring, as shown in Figs. 2 to 7. The bar $e$ is arranged to slide in a guide in the front face of the frame $a'$ and is held in place by a cover or plate $h$. Pivoted on the front face of the said plate $h$ is a lever $i$, having a pin $i'$ projecting through a slot in the said plate $h$ and extending into the aperture in the clutch-operating device or bar $e$. This lever is formed with a projecting rib or flange $i^2$, which lies in the path of a cam projection $c^7$ on the disk $c$.

Normally the clutch-operating device or latch-bar $e$ is in the position shown in Fig. 2, with its upper end entering the slot $d^3$ in the clutch $d$, so as to hold the said clutch out of engagement with the belt-pulley and in engagement with the stop $a^5$ on the stationary frame or standard $a'$. The projection $f'$ on the rod $f$ rests on the shoulder $e^3$ of the latch-bar $e$, and the pin $i'$ lies in front of the extended spring of the rod $f$. Now upon depressing or drawing down the rod $f$ by means of a treadle or other device (not shown) the projection $f'$, engaging the shoulder $e^3$, depresses the clutch-operating device $e$ out of engagement with the clutch, and the spring $c^4$ immediately throws the clutch into engagement with one of the teeth on the pulley, thus connecting the pulley and the shaft rigidly together for the time being. Then as the disk $c$ rotates the cam $c^7$ engages the flange or rib $i^2$ on the lever $i$ and rocks the said lever, so as to cause the pin $i'$ to engage the extended end of the rod $f$ and throw the projection $f'$ off from the shoulder $e^3$. This permits the clutch-operating device or latch-bar $e$ to rise and enter the groove $c^6$ in the disk $c$. Then as the disk $c$ is just about to complete one rotation the wedge-shaped upper end $e'$ of the latch-bar enters the enlarged mouth of the groove $d^3$ in the clutch $d$, and the continued movement of the disk $c$ causes the withdrawal of the said clutch out of engagement with the pulley and throws the shoulder $d^2$ into engagement with the stop on the frame or standard $a'$. Hence it will be seen that by the mechanism just described the shaft is given one complete rotation and is automatically stopped and locked until the rod $f$ is again depressed. A spring $f^4$ is employed for raising the rod $f$ after it has been depressed to allow the projection $f'$ to slip over the shoulder $e^3$ in the clutch-operating device or bar $e$.

Having thus explained the nature of the invention and described a way of constructing and using the same, though without attempting to set forth all of the forms in which it may be made or all of the modes of its use, I declare that what I claim is—

1. A clutch mechanism comprising a stationary frame having a stop, a rotating driving member, a rotatory driven member, a sliding clutch carried by the last said member, and adapted to alternately engage the stop on the stationary frame, and the said driving member, and a device independent of the stationary part of the frame for operating said clutch.

2. A clutch mechanism comprising a rotating driving member, a rotatory driven member, a frame for supporting said members and having a stop, a clutch carried by the last said member and arranged to alternately engage the driving member and the stationary frame, a spring to thrust the clutch into engagement with the driving member, and a latch-bar arranged to normally hold the said clutch out of engagement with said driving member and in engagement with the stop on the stationary frame.

3. A clutch mechanism comprising a frame having a stop, a rotating driving member, a rotatory driven member, a clutch carried by the last said member, and arranged parallel to the axes of the said members, said clutch being adapted to alternately engage the stop and the driving member, a spring for holding the clutch in engagement with the driving member, a latch-bar for holding the said clutch normally out of engagement with the driving member, means for withdrawing said latch, to permit said clutch to engage said driving member, and automatically-acting means for releasing said latch-bar after it has been withdrawn to disengage the clutch from the driving member.

4. A clutch mechanism comprising a stationary frame having a stop, two confronting driving and driven members, a spring-held clutch carried by the driven member and arranged to alternately engage the driving member, and the stop on the frame, a latch-bar for disengaging the clutch from the driving member and holding it in engagement with the stop on the stationary frame or bearing, means for withdrawing said latch-bar, and means for releasing said latch-bar automatically.

In testimony whereof I have signed my name to this specification, in the presence of two subscribing witnesses, this 15th day of October, A. D. 1897.

GUSTAF LIBERT REENSTIERNA.

Witnesses:
A. D. HARRISON,
P. W. PEZETTI.